United States Patent
Gould et al.

(10) Patent No.: US 7,180,328 B2
(45) Date of Patent: Feb. 20, 2007

(54) APPARATUS AND METHOD FOR LARGE HARDWARE FINITE STATE MACHINE WITH EMBEDDED EQUIVALENCE CLASSES

(75) Inventors: Stephen Gould, Queens Park (AU); Ernest Peltzer, Eastwood (AU); Robert Matthew Barrie, Double Bay (AU); Michael Flanagan, Newtown (AU); Darren Williams, Newtown (AU)

(73) Assignee: Sensory Networks, Inc., East Sydney (AU)

(*) Notice: Subject to any disclaimer, the term of this patent is extended or adjusted under 35 U.S.C. 154(b) by 402 days.

(21) Appl. No.: 10/850,978

(22) Filed: May 21, 2004

(65) Prior Publication Data

US 2005/0035784 A1    Feb. 17, 2005

Related U.S. Application Data

(60) Provisional application No. 60/473,373, filed on May 23, 2003.

(51) Int. Cl.
 *H03K 19/173* (2006.01)
 *G06F 7/38* (2006.01)
(52) U.S. Cl. .............. 326/46; 326/38; 326/40
(58) Field of Classification Search .......... 326/38, 326/40, 46–47
See application file for complete search history.

(56) References Cited

U.S. PATENT DOCUMENTS

| | | | |
|---|---|---|---|
| 5,608,662 A | 3/1997 | Large et al. | |
| 6,167,047 A | 12/2000 | Welfeld | |
| 7,082,044 B2 * | 7/2006 | Gould et al. | 365/49 |
| 2003/0051043 A1 | 3/2003 | Wyschogrod et al. | |
| 2003/0065800 A1 | 4/2003 | Wyschogrod et al. | |
| 2004/0054848 A1 * | 3/2004 | Folsom | 711/108 |

\* cited by examiner

*Primary Examiner*—Anh Q. Tran
(74) *Attorney, Agent, or Firm*—Townsend and Townsend and Crew LLP

(57) ABSTRACT

A programmable finite state machine (FSM) includes, in part, a first address calculation logic block, a first lookup table, a second address calculation logic block, and a second lookup table. The first address calculation logic block generates an address for the first lookup table based on the received input symbol and the current state. The data stored in first look-up table at the generated address is used by the second address calculation logic block to compute an address for the second lookup table. Data stored in the second lookup table is the next state to which the FSM transitions. The programmable FSMs uses redundant information of the transition table to compress these transitions and thus requires a smaller memory while maintaining a high data throughput. The data in the first and second lookup tables are coded and supplied by a compiler. The FSM operation may optionally be pipelined.

56 Claims, 16 Drawing Sheets

INPUT SYMBOL

| | | 0 | 1 | 2 | 3 | 4 | 5 | 6 | 7 | 8 | 9 | @ | "." | "-" | C | O | M |
|---|---|---|---|---|---|---|---|---|---|---|---|---|---|---|---|---|---|
| CURRENT STATE | 0 | 0 | 1 | 1 | 1 | 1 | 1 | 1 | 1 | 1 | 1 | 0 | 0 | 0 | 0 | 0 | 0 |
| | 1 | 1 | 1 | 1 | 1 | 1 | 1 | 1 | 1 | 1 | 1 | 2 | 0 | 0 | 0 | 0 | 0 |
| | 2 | 0 | 3 | 3 | 3 | 3 | 3 | 3 | 3 | 3 | 3 | 0 | 0 | 0 | 0 | 0 | 0 |
| | 3 | 3 | 3 | 3 | 3 | 3 | 3 | 3 | 3 | 3 | 3 | 2 | 4 | 4 | 0 | 0 | 0 |
| | 4 | 0 | 1 | 1 | 1 | 1 | 1 | 1 | 1 | 1 | 1 | 0 | 0 | 0 | 5 | 0 | 0 |
| | 5 | 0 | 1 | 1 | 1 | 1 | 1 | 1 | 1 | 1 | 1 | 0 | 0 | 0 | 0 | 6 | 0 |
| | 6 | 0 | 1 | 1 | 1 | 1 | 1 | 1 | 1 | 1 | 1 | 0 | 0 | 0 | 0 | 0 | 7 |
| | 7 | 7 | 7 | 7 | 7 | 7 | 7 | 7 | 7 | 7 | 7 | 7 | 7 | 7 | 7 | 7 | 7 |

APPARATUS AND METHOD FOR LARGE HARDWARE FINITE STATE MACHINE WITH EMBEDDED EQUIVALENCE CLASSES

CROSS-REFERENCES TO RELATED APPLICATIONS

The present application claims benefit under 35 USC 119(e) of the filing date of U.S. provisional application No. 60/473,373, filed on May 23, 2003, entitled "Apparatus And Method For Large Hardware Finite State Machine With Embedded Equivalence Classes", the content of which is incorporated herein by reference in its entirety.

FIELD OF THE INVENTION

The present invention relates to integrated circuits, and more particularly to programmable finite state machines with high throughput.

BACKGROUND OF THE INVENTION

Deep content inspection of network packets is driven, in large part, by the need for high performance quality-of-service (QoS) and signature-based security systems. Typically QoS systems are configured to implement intelligent management and deliver content-based services which, in turn, involve high-speed inspection of packet payloads. Likewise, signature-based security services, such as intrusion detection, virus scanning, content identification, network surveillance, spam filtering, etc., involve high-speed pattern matching on network data.

The signature databases used by these services are updated on a regular basis, such as when new viruses are found, or when operating system vulnerabilities are detected. This means that the device performing the pattern matching must be programmable.

As network speeds increase, QoS and signature-based security services are finding it increasingly more challenging to keep up with the demands of the matching packet content. The services therefore sacrifice content delivery or network security by being required to miss packets. Currently, fast programmable pattern matching machines are implemented using finite state machines (FSM).

FIGS. 1A and 1B respectively show state transition diagrams 100 and state transition tables 110 of a finite state machine (FSM) adapted to perform the following Regular Expression:

$$.*[1-9][0-9]*@[1-9][0-9]*(.|\text{-})\text{COM}.* \quad (1)$$

For purposes of simplicity, it is assumed that only the sixteen symbols used in expression (1) are defined. It is understood that expression (1) may include a string containing any of the digits 1–9, followed by any of the digits 0–9, followed by the "@" symbol; followed by any of the digits 1–9, followed by any of the digits 0–9; followed by either a single period (.) or hyphen (-), followed by the letters "COM". Examples of strings that match the expression are shown below:

12345@6789-COM

COM10@89.COM

Examples of strings that do not match the expression are shown below:

123456789

0@0.COM

Many of the state transitions, particularly those that transition back to the start state are omitted from the state transition diagram 100 for simplicity. State transition diagram is a deterministic finite state automata (DFA). Table 110 lists the current state along the rows, and the current input symbols along the columns. Each entry in table 100 defines the state to which transition is made to given the combined current state and current input symbol.

There are two types of FSMs. In a Moore FSM, shown in FIG. 2A, the input symbol and current state are received by a logic block 200 which is configured to generate the next state; this next state is saved in a register 210. Register 210 is clocked every time a new input symbol arrives. The output symbol is generated by an output logic block. The following pseudo-code shows that the output of a Moore FSM is determined by the current state of the FSM:

MOORE_OUTPUT=OUTPUT_TABLE[CURRENT_STATE]

In a Mealy FSM, shown in FIG. 2B, the input symbol and current state are received by logic block 250 which is configured to generate the next state. The next logic state together with the received input symbol define the output symbol. The following pseudo-code shows that the output of a Mealy FSM is determined by the current state of the FSM together with the received input symbol:

MEALY_OUTPUT=OUTPUT_TABLE[CURRENT_STATE][INPUT_SYMBOL]

FIG. 3 is a simplified high-level block diagram of a conventional programmable Moore FSM 350. The transition table for FSM 350 is stored in a transition table memory 300 and is indexed by the current state and input symbol. This memory is clocked after the receipt of each new input symbol. The output is read from an output look-up table memory 310 indexed by the current state. FSM implementation 350 is flexible in that it is programmable and can implement state transitions at relatively high-throughput. However as the number of data related to the states, input symbols and transitions become large, the amount of memory needed to store this data grows exponentially. For an n-bit state vector and k-bit symbol, FSM 350 requires $2^{n+k}$ memory locations for the transition table 300, and $2^n$ memory locations for output look-up table 310.

As is known, the process of mapping a regular expression, such as expression (1) shown above, or signature database, to a FSM involves compiling the expression into a non-deterministic finite-state automaton (NFA), and then converting the NFA to a deterministic finite-state automaton (DFA).

In addition to pattern matching through regular expressions, FSMs also have applications in protocol specification, implementation and validation such as TCP/IP, expert systems and machine learning where knowledge is expressed as decision trees or stored in directed graphs, formal modeling, and image processing.

An FSM typically starts in a given initial state, usually state zero. On receipt of each input symbol, the FSM advances to a new state determined by the current state, together with the input symbol. This operation is referred to as calculating the "next state" or "transition function" of the finite state machine. The calculation of the next state is often performed through a table lookup. The table (see FIG. 1B), known as the "transition table", is arranged so as having the row number determined by the current state and the column number by the current input symbol. Each entry in the transition table contains the value for the next state given that current state, as defined by the row, and the input symbol, as defined by the column. The transition table is commonly stored using a RAM lookup table, as shown in FIG. 3. Data symbols received from a digital network are usually encoded as 8-bit bytes, and the number of states is determined by the complexity of the given application. The following pseudo-code illustrates the FSM operation:

```
CURRENT_STATE = 0
for each INPUT_SYMBOL,
    NEXT_STATE =TRANSITION_TABLE[CURRENT_STATE]
    [INPUT_SYMBOL]
CURRENT_STATE = NEXT_STATE
next INPUT_SYMBOL
```

Programmable FSMs are often expensive because of the size of the memory required to store the transition table. This problem is even more pronounced for fast FSMs which are required to compute the next state within a few and fixed number of clock cycles. For example, the state machine implementation shown in FIG. 3, having n-bit state vector and k-bit symbols, requires $2^{n+k}$ entries of n-bit words, or $2^{n+k} \times n$ bits, for storing the full transition table. Additional memory is required for the output look-up table. For example, for an application servicing 1 Gbps network traffic, the FSM is required to compute the next state every 8 ns, for 8-bit input symbols.

U.S. Pat. No. 6,167,047 describes a technique in which memory optimization is achieved through usage of stack memory allowing the state machine to repeat common sub-expressions while calculating the next state within a single clock cycle. This technique uses a large memory, and therefore limits the complexity of the FSM. This technique also suffers from the problem that the stack memory is limited.

U.S. Patent application No. 2003/0051043 describes a technique for performing regular expression pattern matching using parallel execution of real-time deterministic finite state automata (RDFA). The technique involves processing data at higher speeds by combining a number of bytes into an aggregate symbol. This technique involves creation of n-closures which increase the size of the FSM as the number of potential transitions per state increases exponentially.

BRIEF SUMMARY OF THE INVENTION

A programmable finite state machine (FSM), in accordance with one embodiment of the present invention includes, in part, a first address calculation logic block, a first lookup table, a second address calculation logic block, and a second lookup table. The first address calculation logic block is configured to receive a k-bit input symbol data and an n-bit current state data and generate an address for the first lookup table. The data stored in first look-up table at the generated address is used by the second address calculation logic block to compute an address for the second lookup table. Data stored in the computed address of the second lookup table is the next state to which the FSM transitions.

In some embodiments, the FSM includes a pipeline register disposed between the first address calculation logic block and the first lookup table, a second pipeline register disposed between the first lookup table and the second address calculation logic block, and a third pipeline register disposed between the second address calculation logic block and the second lookup table. The pipeline registers are adapted to process multiple data streams concurrently by having a different data stream occupy each pipeline stage.

Data at each pipeline stage is passed forwards through that pipeline. Since multiple streams are being processed concurrently, throughput is improved.

In accordance with the present invention, redundancy within the blocks of the transition table is used for efficient storage of data in the lookup tables. Therefore, bits from input symbol and current state are combined in order to supply address to the first lookup table so as to achieve greater throughput and reduce the need for memory capacity. Given that there are $2^{n+k}$ entries in these transition table for n-bit states and k-bit symbols, grouping the transition table entries into blocks of $2^q$, allows the first lookup table to have $2^{n+k-q}$ locations, addressed by a (n+k−q)-bit address. The number of locations in the second look-up table is determined by the redundancy in the state transition table.

In one embodiment, the first address calculation logic block (405 or 505) uses k−q bits of the input symbol and the n-bit current state to generate an (k−q+n)-bit address to the first lookup table. The remaining q bits of the input symbol are used by the second address calculation logic block. Generating the address for the first lookup table address in this manner, enables portioning the table along its rows into blocks each having $2^q$ entries. In another embodiment, the first address calculation logic block uses k bits of the input symbol and (n−q) bits from the current state to generate an (n−q+k)-bit address to the first lookup table. The remaining q bits of the current state are used by the second address calculation logic unit. Generating the address for the first lookup table address in this manner, enables portioning the table along its columns into blocks each having $2^q$ entries. In yet another embodiment, the first address calculation logic block uses (k−p) bits of the input symbol and (n−q) bits from the current state to generate an (k+n−q−p)-bit address to the first lookup table. The remaining (q+p) bits of the input symbol and current state are used by the second address calculation logic block. Generating the address for the first lookup table address in this manner, enables portioning the table along its columns or rows into blocks each having $2^{q+p}$ entries.

In one embodiment, the first lookup table includes a mask value and a base value for each of the transition blocks in the state transition table. The base and mask value for each transition block correspond to that transition block's location in the transition table. The second address calculation logic adds an offset value—determined based on the associated mask value—to the base to determine the address in the second lookup table where the next state transition is stored. In some instances this offset is zero.

In another embodiment, the first lookup table includes a Boolean flag value and a base value for each of the transition blocks in the state transition table. The Boolean flag and mask value for each transition block correspond to that transition block's location in the transition table. The second address calculation logic adds an offset value—determined using the Boolean flag and using a predefined number of bits from the first state and the input symbol—to the base to determine the address in the second lookup table where the next state transition is stored. In some instances this offset is zero.

The programmable FSMs, in accordance with the present invention, uses redundant information in the FSM transition tables to compress these transitions and thus requires a smaller memory while maintaining a high data throughput. The data is compressed by benefiting from the redundancy in state transitions and is coded in the first and second lookup tables. Even greater memory efficiency is achieved by renumbering the states within the state machine. It is understood that the entries in the first and second lookup tables are supplied by a compiler.

DETAILED DESCRIPTION OF THE INVENTION

Figure 4:
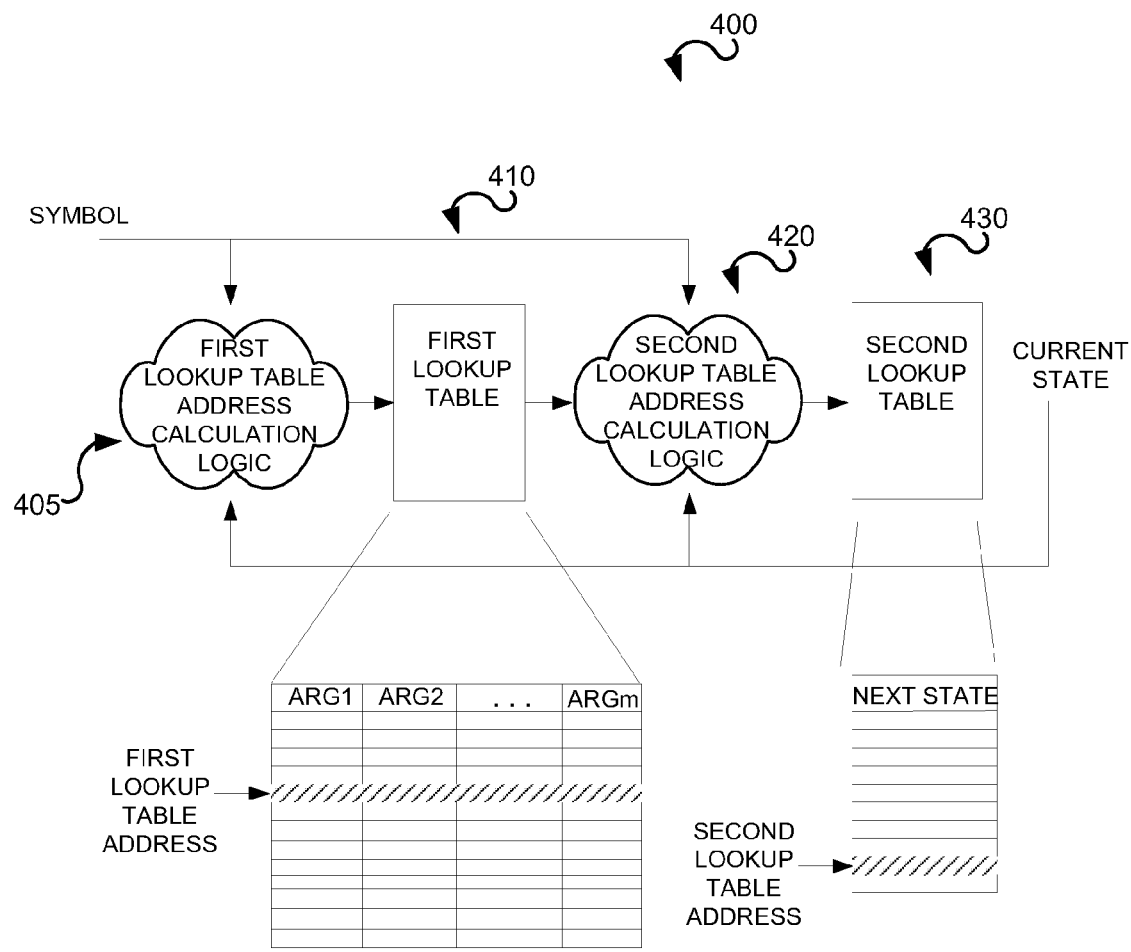
FIG. 4 is a simplified high-level block diagram of a programmable finite state machine, in accordance with one embodiment of the present invention.

FIG. 4 is a simplified high-level block diagram of a programmable finite state machine (FSM) 400, in accordance with one embodiment of the present invention. Programmable FSM 400 is shown as including a first address calculation logic 405, a first lookup table 410, a second address calculation logic 420, a second lookup table 430. As described further below, FSM 400 has a high throughput and uses a relatively smaller memory to store the state transitions data than those known in the prior art.

In the following, k is the number of bits required to represent each symbol, n is the number of bits required to represent each state within the FSM, and q is the number of bits used within each block when partitioning the FSM transition table. Thus, the total number of states is $2^n$, and each block contains $2^q$ entries. For example, up to 256 symbols may be represented if k is equal to 8.

Figure 3:
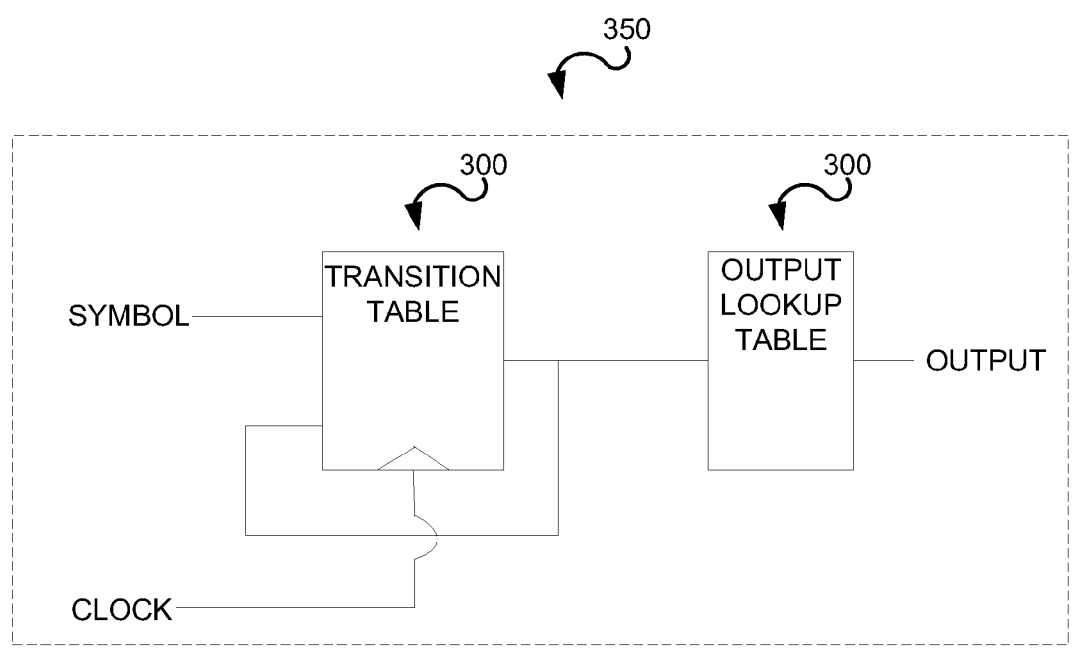
FIG. 3 is a simplified high-level block diagram of a programmable Moore FSM.

First address calculation logic 405 is configured to receive a k-bit input symbol data and an n-bit current state data and generate an address for the first lookup table 410. The data stored in first look-up table at the generated address, together with the current state and input symbol is used by the second address calculation logic block 420 to computes an address for the second lookup table 430. Data stored in the addresses of lookup table 430 are the next state to which the FSM transitions. It is understood that FSM outputs may be achieved by, for example, accessing a third lookup table (see FIG. 3), or by appending to the date stored in the second lookup table. The algorithm implemented by FSM 400 is also shown by the following pseudo-code:

```
initialise CURRENT_STATE
while data available,
    receive INPUT_SYMBOL
    FIRST_ADDRESS = function_one(INPUT_SYMBOL, CURRENT_STATE)
    (ARG1, ARG2, . . .) = FIRST_LUT[FIRST_ADDRESS]
    SECOND_ADDRESS  =  function_two(INPUT_SYMBOL,  CURRENT_STATE,
ARG1, ARG2, . . .)
    NEXT_STATE = SECOND_LUT[SECOND_ADDRESS]
    CURRENT_STATE = NEXT_STATE
end while
```

Figure 5:
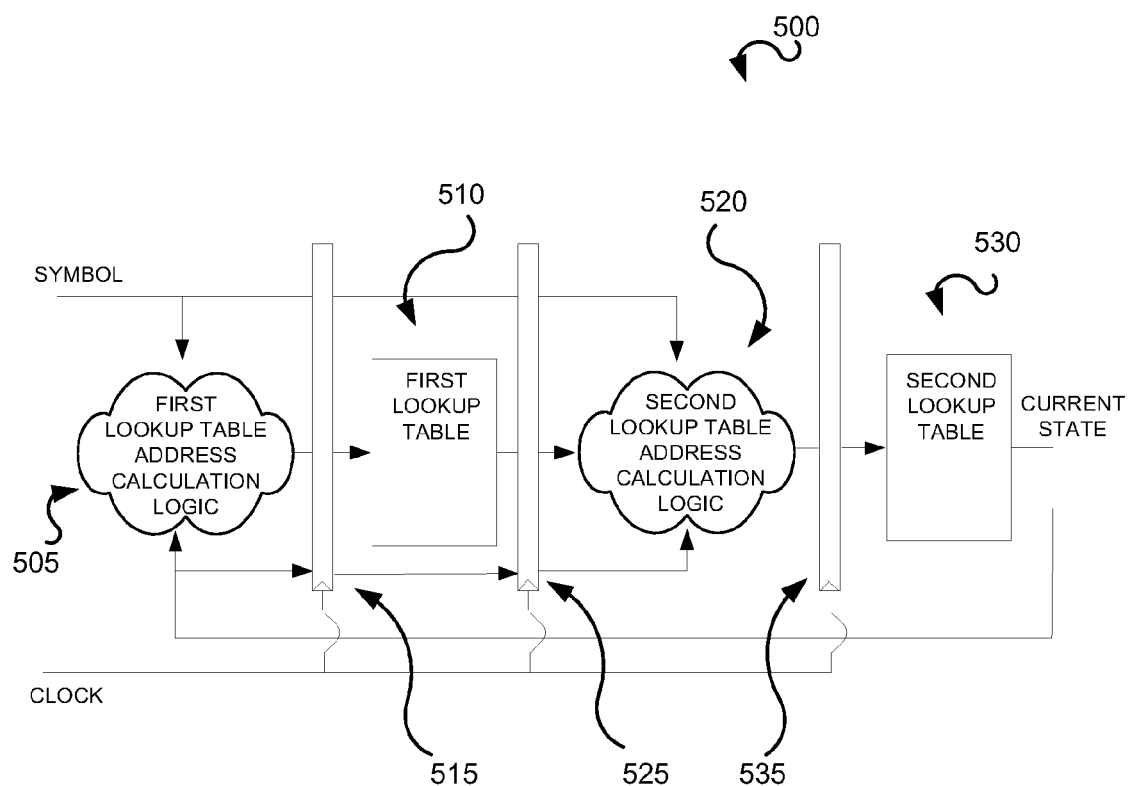
FIG. 5 is a simplified high-level block diagram of a programmable finite state machine, in accordance with another embodiment of the present invention.

FIG. 5 is a simplified high-level block diagram of a programmable FSM 500, in accordance with another embodiment of the present invention. FSM 500 is shown as including a first address calculation logic 505, a first lookup table 510, a second address calculation logic 520, a second lookup table 530, pipeline register 515 disposed between first address calculation logic 505 and first lookup table 510, pipeline register 525 disposed between first lookup table 510 and second address calculation logic 520, and pipeline register 525 disposed between second address calculation logic 520 and second lookup table 530. Pipeline registers 515, 525, and 535 are adapted to process multiple data streams concurrently by having a different data stream occupy each pipeline stage.

Data at each pipeline stage is passed forwards through that pipeline. Since multiple streams are being processed concurrently, throughput is improved. It is understood that other embodiments may include more or fewer pipeline registers. It is further understood that if there are L pipeline stages, and input symbols arrive at the rate of S symbols per second per data stream, then the pipeline has a clock frequency of at least L×S Hz.

Figure 6A:
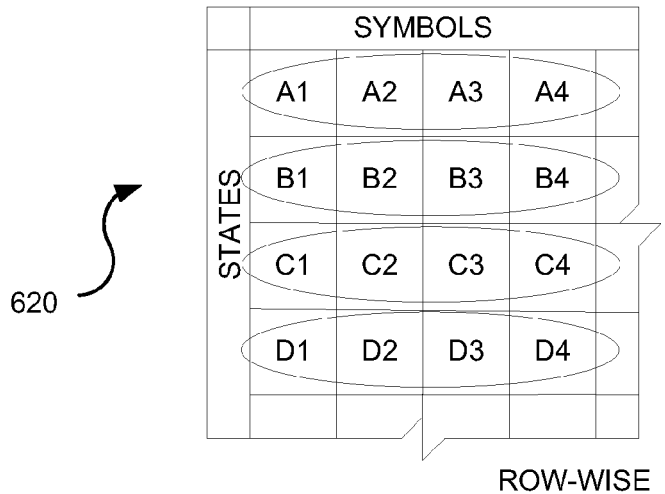
FIG. 6A shows an address lookup table partitioned into blocks along the rows of the table, in accordance with one embodiment of the present invention.
Figure 6B:
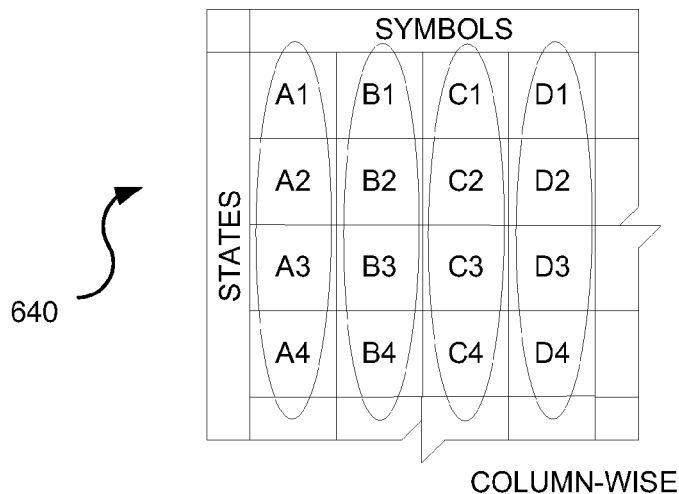
FIG. 6B shows an address lookup table partitioned into blocks along the columns of the table, in accordance with another embodiment of the present invention.
Figure 6C:
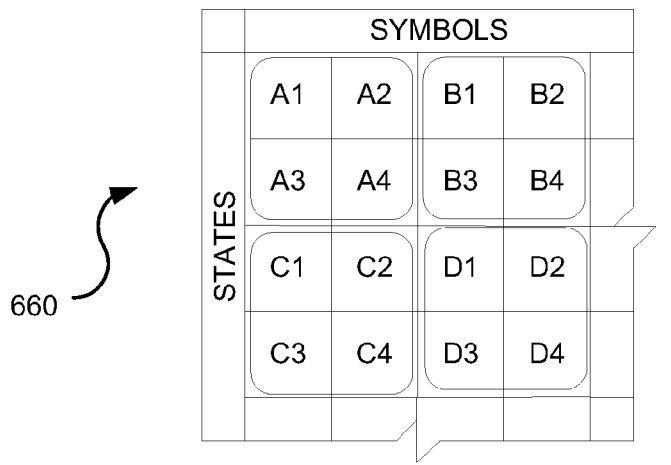
FIG. 6C shows an address lookup table partitioned into blocks along the rows and columns of the table, in accordance with another embodiment of the present invention.

In accordance with the present invention and as shown below, redundancy within the FSM transition table is used for efficient storage of data in the first and second lookup tables. Therefore, bits from input symbol and current state are combined in order to supply address to the first lookup table (FIGS. 4–5) so as to achieve greater throughput and reduced need for memory capacity. Given that there are $2^{n+k}$ entries in the FSM transition table for n-bit states and k-bit symbols, grouping the transition table entries into blocks of $2^q$, allows each of first lookup tables to have $2^{n+k-q}$ locations, addresses by a (n+k−q)-bit address. FIGS. 6A–6C show how partitioning of the transition table is done row-wise by taking all the current state bits and some of the input symbol bits, column-wise by taking all of the input symbol bits and some of the current state bits, or block-wise by taking some bits from both the current state and input symbol.

In one embodiment, the first address calculation logic (405 or 505) uses k−q bits of the input symbol and the n-bit current state, and generates an (k−q+n)-bit address to the first lookup table. The remaining q bits of the input symbol are used by the second address calculation logic unit. Generating the address for the first lookup table address in this manner, enables portioning the table along its rows into blocks each having $2^q$ entries. For example, if q is equal to 2, the first lookup table is partitioned into blocks of 4 entries, as shown in exemplary transition table 620 of FIG. 6A.

In accordance with another embodiment, the first address calculation logic (405 or 505) uses k bits of the input symbol and (n−q) bits from the current state, and generates an (n−q+k)-bit address to the first lookup table. The remaining q bits of the current state are used by the second address calculation logic unit. Generating the address for the first lookup table address in this manner, enables portioning the table along its columns into blocks each having $2^q$ entries. For example, if q is equal to 2, the first lookup table is partitioned into blocks each having 4 entries, as shown in exemplary transition table 640 of FIG. 6B.

Figure 11:
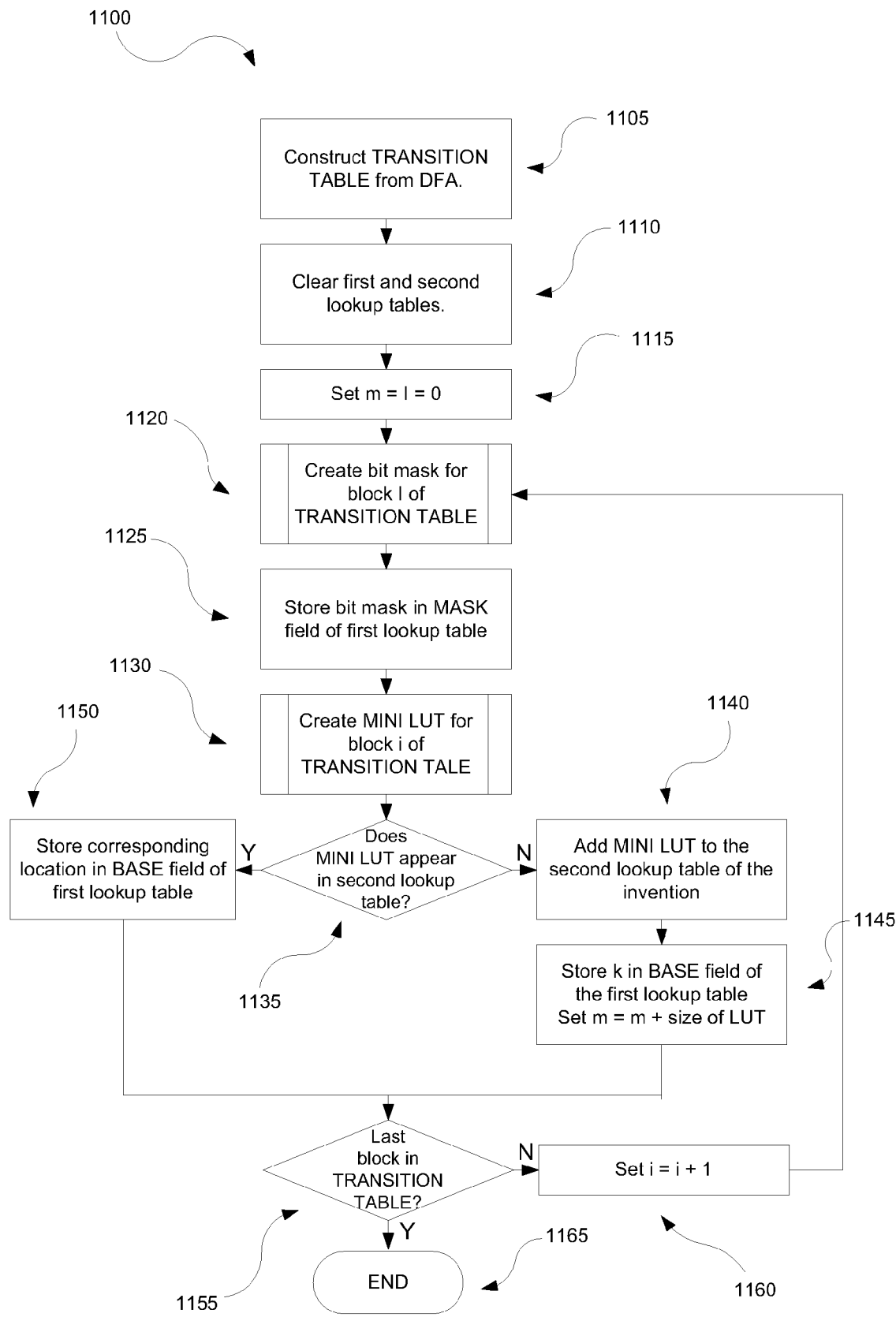
FIG. 11 is a flowchart of the steps carried out to code the transitions blocks of a transition table into entries in associated first and second lookup tables, in accordance with one embodiment of the present invention.

In accordance with yet another embodiment, the first address calculation logic (405 or 505) uses (k−p) bits of the input symbol and (n−q) bits from the current state, and generates an (k+n−q−p)-bit address to the first lookup table. The remaining (q+p) bits of the input symbol and current state are used by the second address calculation logic unit. Generating the address for the first lookup table address in this manner, enables portioning the table along its columns or rows into blocks each having $2^{q+p}$ entries. For example, if (q+p) is equal to 2, the first lookup table is partitioned into blocks each having 4 entries, as shown in exemplary transition table 630 of FIG. 6C. It is understood that entries in the first and second look-up tables are generated using a compiler. As is understood, the complier implements an algorithm and may be software or hardware based. Such algorithm takes as input a regular expression or some other formal description for the finite state machine (FSM). The compiler generates a transition table representation of the FSM. The compiler then analyses the transition table to produce entries for the first and second lookup tables; a method to produce these entries is shown in FIG. 11 and described in detail below. The method uses a greedy algorithm for producing a compact representation of the FSM. Those skilled in the art understand that similar algorithms exist for other examples and embodiments of the invention.

Figures 1A, 1B:
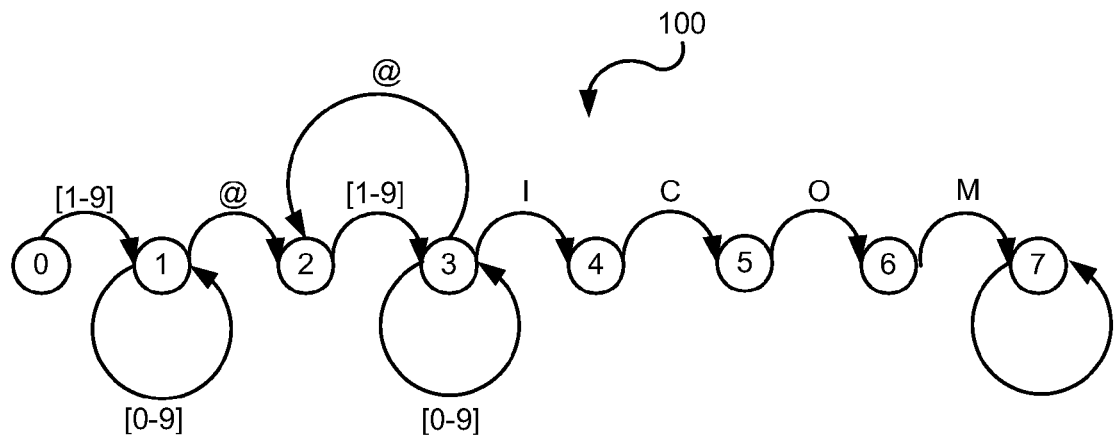
FIGS. 1A and 1B are exemplary state transition diagrams and state transition tables.
Figure 2A:
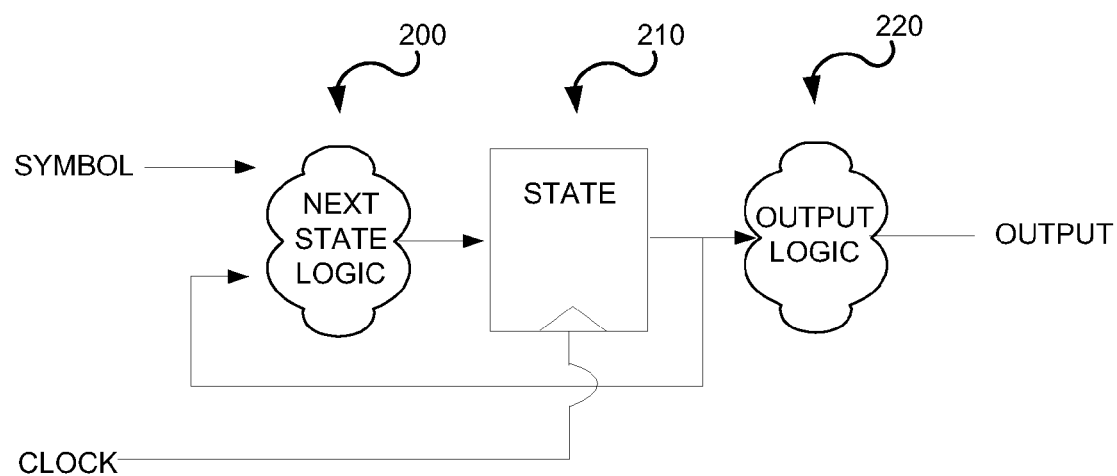
FIG. 2A is a Moore finite state machine (FSM), as known in the prior art.
Figure 2B:
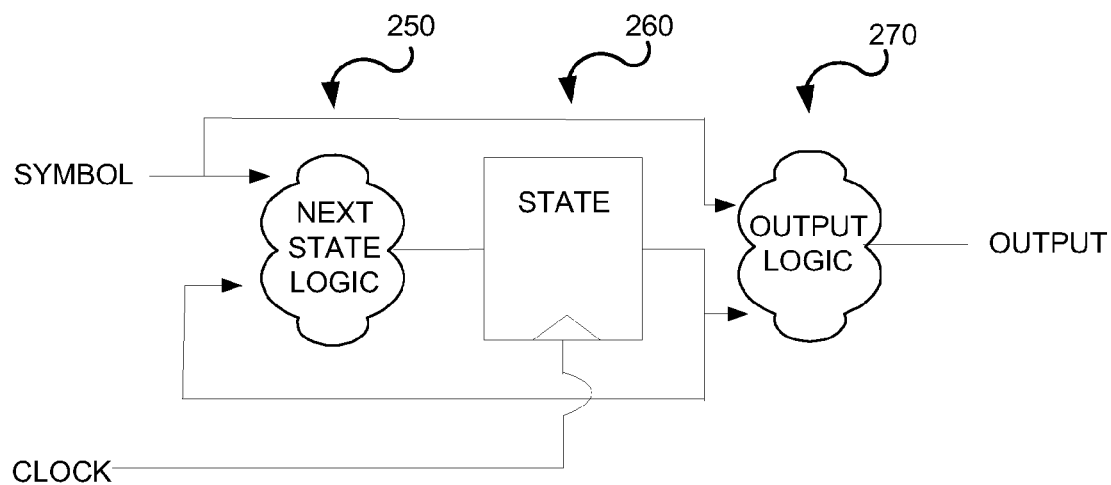
FIG. 2B is a Mealy finite state machine, as known in the prior art.

To aid in understanding the present invention, the following examples are made with reference to state transition table 110 of FIG. 1. This transition table has eight states (n=3) and sixteen input symbols (k=4), and implements the following expression:

.*[1–9][0–9]*@[1–9][0–9]*(\.|-)COM.*

Figure 7A:
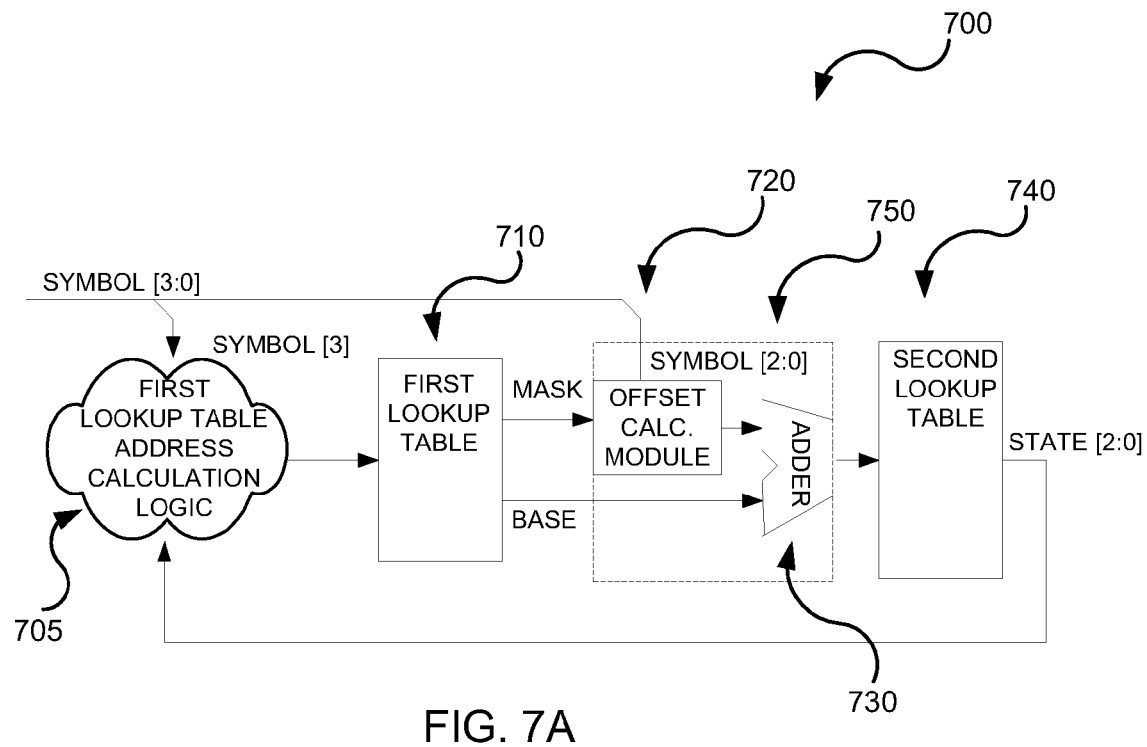
FIG. 7A shows an exemplary programmable finite state machine, having a first look-up table with rows that are partitioned in to blocks.
Figure 7B:
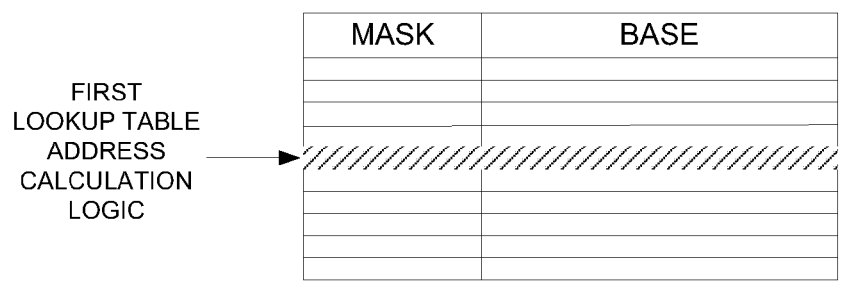
FIG. 7B shows the multitude of mask and base values stored in various addresses of the first look-up table of the programmable finite state machine of FIG. 7A, in accordance with one embodiment of the present invention.

FIG. 7A shows an exemplary programmable FSM 700 having disposed therein a first lookup table 710 that is partitioned into blocks along its rows, where each transition block contains eight entries, i.e., q=3. In other words, row-wise table partitioning is used in indexing the first lookup table 710. First address calculation logic unit 710 is configured to concatenate the 3-bit of the current state with the most significant bit of the 4-bit input symbol to form the address for the first lookup table 710. The first lookup table 710 contains a mask field and a base field for each transition block, as is shown in FIG. 7B. The mask field and remaining input symbol bits are supplied to offset calculation module 720, and the base fields are supplied to adder 730. Offset calculation module 720 together with adder 730 form the second address calculation logic 750. The second address calculation logic 750 uses the mask and unused bits from the input symbol, to determine a count of the number bits in the mask that are set to a logical one and appear in bit positions less than or equal to the index in the block corresponding to the input symbol in order to compute and deliver the computed address to the second lookup table 740. Second table lookup 740 retrieves and outputs the next state. The following is a pseudo-code of how given a new input symbol and the current state, the next stats is determined by FSM 700.

```
initialise CURRENT_STATE
while data available,
    receive INPUT_SYMBOL
    set FIRST_ADDRESS =
    CURRENT_STATE . INPUT_SYMBOL[k−1:q]
    (MASK, BASE) = FIRST_LUT[FIRST_ADDRESS]
    set INDEX = 2 ^ INPUT_SYMBOL[q−1:0]
    if MASK[INDEX] = 0 then
        set OFFSET = 0
    else
        set OFFSET = 0
        for i = 0 to INDEX,
            if MASK[i] = 1 then
                set OFFSET = OFFSET + 1
            end if
        next i
    end if
    set SECOND_ADDRESS = BASE + OFFSET
    set NEXT_STATE = SECOND_LUT[SECOND_ADDRESS]
    set STATE = NEXT_STATE
end while
```

As described above, the address of the second lookup table, SECOND_ADDRESS, is dependent on the mask and the associated base values stored in table 710. Table I provides a description of an exemplary algorithm used to calculate the offset values, where it is assumed that q is equal to 3, (i.e. 8 entries within each transition table block) and the mask is equal to binary 01001110. The offset used to calculate the address in the second lookup table 740 is determined for each of the 8 possible values of the q-bit word. In Table I, the first bit position, i.e., INDEX=0, corresponds to the leftmost bit in the mask (the underlined bit of 01001110), and the last bit position, i.e., INDEX=7, corresponds to the rightmost bit in the mask (the underlined bit of 01001110).

TABLE I

| q-bit word | INDEX | Corresponding Bit in Mask | Offset |
| --- | --- | --- | --- |
| 000 | 0 | 01001110 | 0 |
| 001 | 1 | 01001110 | 1 |
| 010 | 2 | 01001110 | 0 |
| 011 | 3 | 01001110 | 0 |
| 100 | 4 | 01001110 | 2 |
| 101 | 5 | 01001110 | 3 |
| 110 | 6 | 01001110 | 4 |
| 111 | 7 | 01001110 | 0 |

For example, if INDEX=0, the corresponding bit mask, shown as underlined in Table I, is 0, therefore, the assoacited offset is also equal to 0. If INDEX=1, the corresponding bit mask, shown as underlined in Table I, is 1. Accordingly, the offset is calculated by adding a 1 to the number of 1s that are positioned to the left of this bit. Because there are no 1s to the left of this bit, an offset of 1 is calculated when INDEX is equal to 4. If INDEX=2, the corresponding bit mask, shown as underlined in Table I, is 0, therefore, the assoacited offset is also equal to 0. Similarly, if INDEX=3, the the corresponding bit mask, shown as underlined in Table I, is 0, therefore, the assoacited offset is also equal to 0. If INDEX=4, the the corresponding bit mask, shown as underlined in Table I, is 1. Accordingly, the offset is calculated by adding a 1 to the number of 1s that are positioned to the left of this bit. Because there is one 1 to the left of this bit, an offset of 2 is calculated when INDEX is equal to 1. If INDEX=5, the the corresponding bit mask, shown as underlined in Table I, is 1. Accordingly, the offset is calculated by adding a 1 to the number of 1s that are positioned to the left of this bit. Because there are two 1s to the left of this bit, an offset of 3 is calculated when INDEX is equal to 5. Calculation of offset values for index values of 6 and 7 are the same, as described above.

Figure 7C:
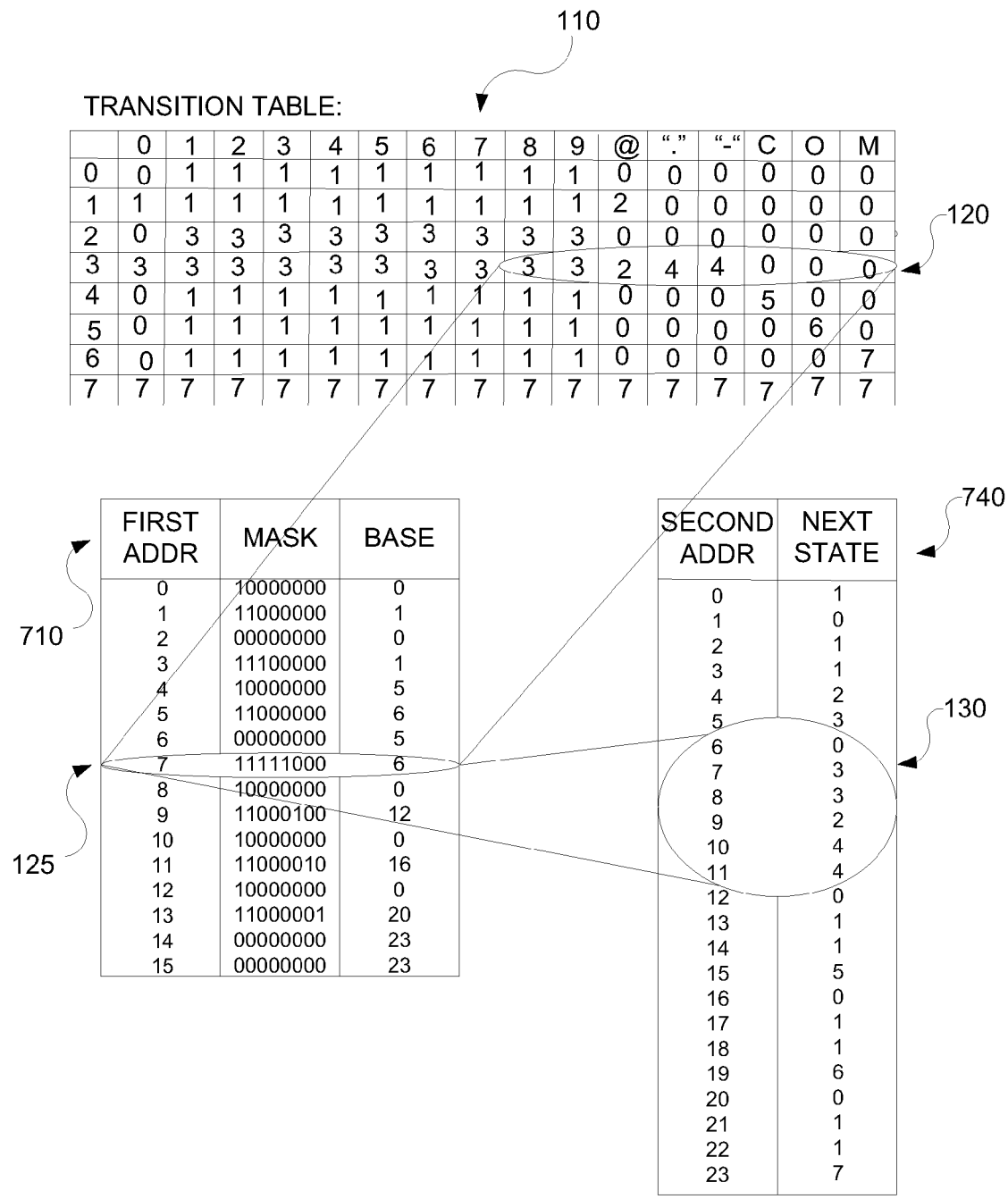
FIG. 7C shows mask and base values stored in first lookup table.

FIG. 7C shows mask and base values stored in first lookup table 710, as well as corresponding next states stored in second lookup table 740 of FSM 700 (see FIG. 7A), in accordance with one exemplary embodiment, for transition table 110. It is understood that the addresses for lookup tables 710 and 740 are shown to aid in understanding the example and are not stored in these tables. Because in this example q is assumed to be equal to 3, table 110 is partitioned along its rows into 16 blocks each with 8 entries—that collectively represent the 128 transitions of this table. Accordingly, lookup table 710 is configured to include 16 addresses, numbered 0 through 15. The following is a description of the manner by which state transitions in transition block 120 of table 110 are represented in first lookup tables 710 and 740. Transition block 120 is the 8th transition block in transition table 110, if these blocks are read from left to right in the ascending row order. Accordingly, it is represented in address 7 (i.e., the 8th address) in table 110. Mask 11111000 and the base 6 associated with address 7 in lookup table 710 are shown inside perimeter line 125. Mask and base values for other transition blocks are also shown in table 710 but are not described.

Table II below shows the offset values for base 6 of table 710, calculated in accordance with the algorithm described above.

TABLE II

| q-bit word | INDEX | Corresponding Bit in Mask | Offset |
| --- | --- | --- | --- |
| 000 | 0 | 11111000 | 1 |
| 001 | 1 | 11111000 | 2 |
| 010 | 2 | 11111000 | 3 |
| 011 | 3 | 11111000 | 4 |
| 100 | 4 | 11111000 | 5 |
| 101 | 5 | 11111000 | 0 |
| 110 | 6 | 11111000 | 0 |
| 111 | 7 | 11111000 | 0 |

Adding the above offset values 0–5 to the base of 6, results in corresponding addresses 6–11 in lookup table 740. Referring to FIG. 7A, base calculation module 750 receives mask values, e.g., 11111000, and supplies the offset values, e.g., 0–5, to adder 730. Adder 730 adds the base value, e.g., 6, to the received offset values to generate the associated addresses for the second address lookup table 740. These addresses are shown in table 740 of FIG. 7C inside perimeter line 130. Transition table 110 is used to determine the next state for each of the addresses in second lookup table 740. For example, using block transition 120 of table 100, for addresses 6–11, the next states are respectively 0, 3, 3, 2, 4, and 4. The value of the base address is computed by the compiler when populating the first and second lookup tables. For this example, the base value of 6 corresponds to the starting location within the second lookup table that holds the next states {0, 3, 3, 2, 4, 4}, shown inside perimeter line 130.

Figure 8A:
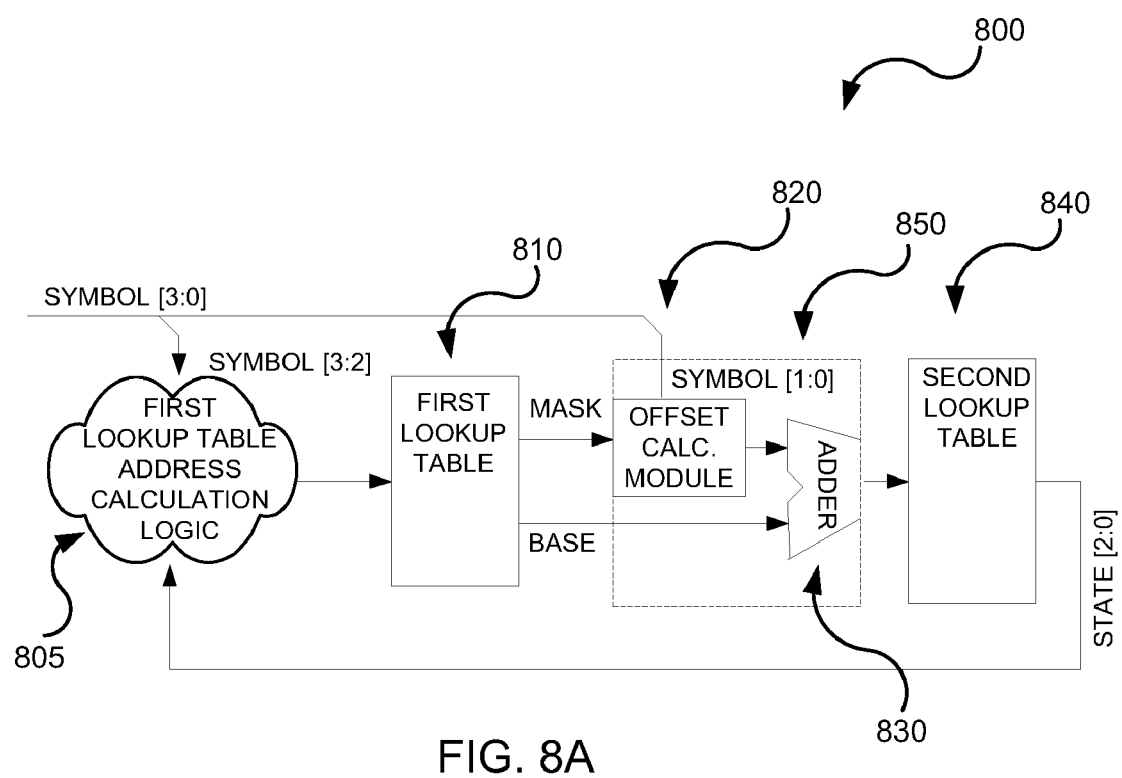
FIG. 8A shows a programmable finite state machine, having a first look-up table with rows that are partitioned in to blocks, in accordance with another embodiment of the present invention.

FIG. 8A shows an exemplary programmable FSM 800 having disposed therein a first lookup table 810 that is partitioned into blocks along its rows, where each transition block contains four entries, i.e., q=2. FSM 800 is similar to FSM 700 shown in FIG. 7, except that the entries in the first lookup table 710 are partitioned into groups of 8 (q=3), whereas the entries in the first lookup table 810 are partitioned into groups of 4 (q=2).

Figure 8B:
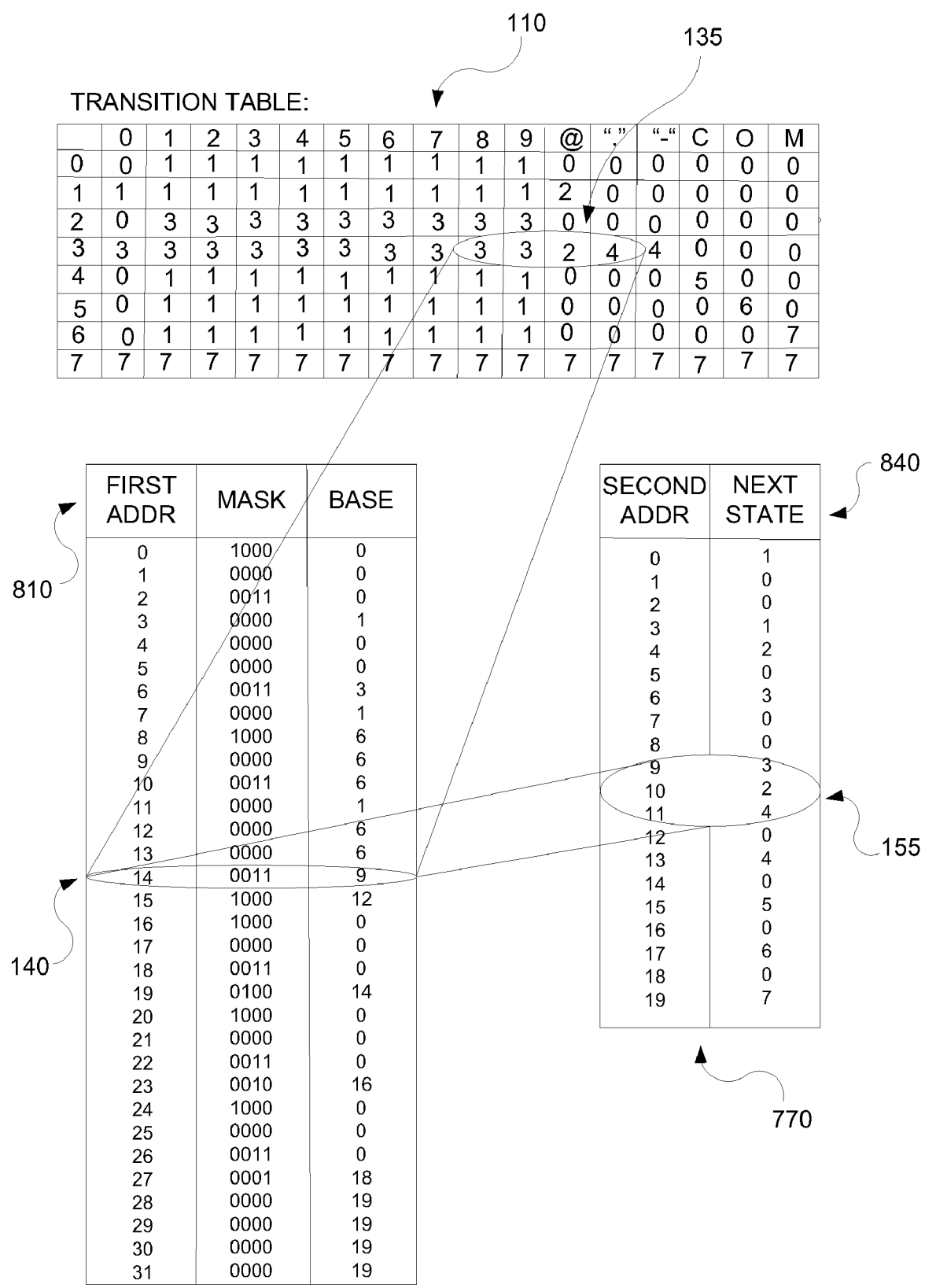
FIG. 8B shows exemplary mask and base values stored in first lookup table, as well as corresponding next states stored in second lookup table of the programmable finite state machine of FIG. 8A.

First address calculation logic unit 805 is configured to concatenate the 3-bit of the current state with the two most significant bits of the 4-bit input symbol to form the address for the first lookup table 810. The first lookup table 810 contains a mask field and a base field for each transition block, as is shown in FIG. 8B. The masks fields are supplied to offset calculation module 820, and the base fields are supplied to adder 830. Offset calculation module 820 together with adder 830 form the second address calculation logic 850. The second address calculation logic 850 uses the mask and unused bits from the input symbol, to determine a count of the number bits in the mask that are set to a logical one and appear in bit positions less than or equal to the index in the block corresponding to the input symbol in order to compute and deliver the computed address to the second lookup table 840, as described above with reference to Tales I and II. Second table lookup 840 retrieves and outputs the next state. The pseudo-code shown above may also be used in FSM 800 to determine the next state given a new input symbol and the current state.

FIG. 8B shows mask and base values stored in first lookup table 810, as well as corresponding next states stored in second lookup table 840 of FSM 800 (see FIG. 8A), for transition table 110. It is understood that the shown addresses for lookup tables 810 and 840 are not stored in these tables. Because in this example q is assumed to be equal to 2, table 110 is partitioned along its rows into 32 blocks each with 4 entries—that collectively represent the 128 transitions of this table. Accordingly, lookup table 810 is configured to include 32 addresses, numbered 0 through 31. Entries 140 and 155 of lookup table 810 and 840, respectively, are associated with transition block 135 of transition table 110. The manner in which entries in lookup tables 810, and 840 are coded are similar to those shown above with respect to FIGS. 7A–7C, and hence are not described below.

It is clear from FIG. 8B that the fifteenth block in the transition table contains the entries {3, 3, 2, 4}. These entries are encoded with mask 0011 and base of 9. The corresponding entries in the second lookup table 840 are {3, 2, 4}. Accordingly, data redundancy is used to achieve compression through use of the first and second lookup tables.

Figure 9A:
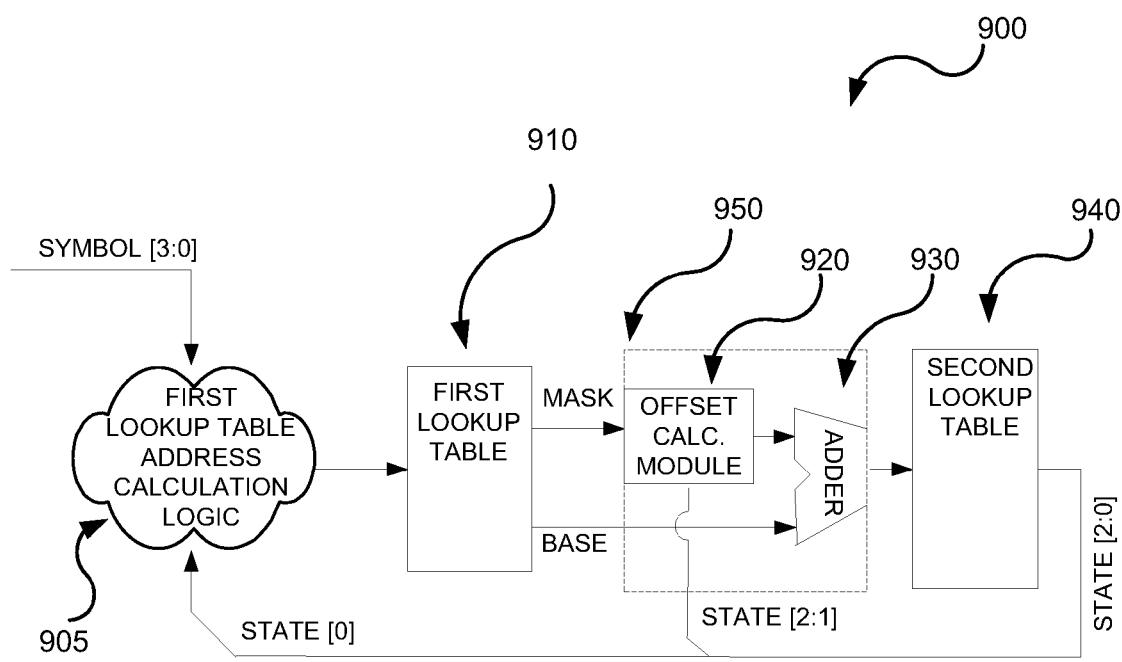
FIG. 9A shows a programmable finite state machine, having a first look-up table with columns that are partitioned in to blocks, in accordance with another embodiment of the present invention.
Figure 9B:
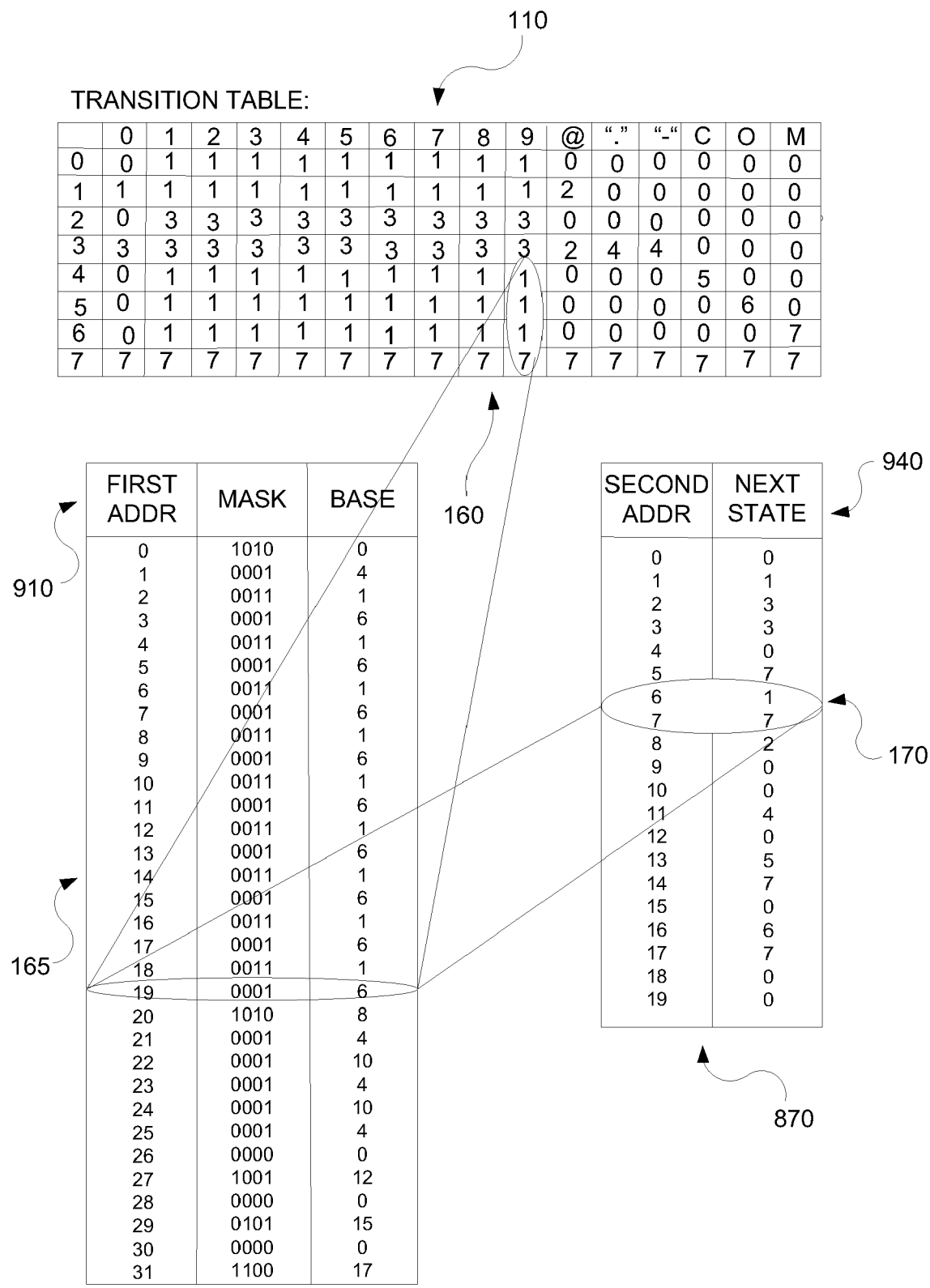
FIG. 9B shows exemplary mask and base values stored in first lookup table, as well as corresponding next states stored in second lookup table of the programmable finite state machine of FIG. 9A.

FIG. 9A shows an exemplary programmable FSM 900 having disposed therein a first lookup table 910 that is partitioned into blocks along its columns, i.e., uses column-wise table partitioning in indexing the first lookup table. First address calculation logic unit 905 is configured to concatenate the most significant bit of the current state with the bits of the 4-bit input symbol to form the address for the first lookup table 910. The first lookup table 910 contains a mask field and a base field for each transition block, as is shown in FIG. 9B. The masks fields are supplied to offset calculation module 920, and the base fields are supplied to adder 930. Offset calculation module 920 together with adder 930 form the second address calculation logic 950. The second address calculation logic 950 uses the mask and unused bits from the current state to determine a count of the number bits in the mask that are set to a logical one and appear in bit positions less than or equal to the index in the block corresponding to the input symbol in order to compute and deliver the computed address to the second lookup table 940, as described above with reference to Tales I and II. Second table lookup 940 retrieves and outputs the next state. The following is a pseudo-code of how given a new input symbol and the current state, the next stats is determined by FSM 900:

```
initialise CURRENT_STATE
while data available,
    receive INPUT_SYMBOL
    set FIRST_ADDRESS =
    INPUT_SYMBOL . CURRENT_STATE[n-1:q]
    (MASK, BASE) = FIRST_LUT[FIRST_ADDRESS]
    set INDEX = 2 ^ CURRENT_STATE[q-1:0]
    if MASK[INDEX] = 0 then
        set SECOND_ADDRESS = BASE
    else
        set OFFSET = 0
        for i = 0 to INDEX,
            if MASK[i] = 1 then
                set OFFSET = OFFSET + 1
            end if
        next i
        set SECOND_ADDRESS = BASE + OFFSET
    end if
    NEXT_STATE = SECOND_LUT[SECOND_ADDRESS]
    STATE = NEXT_STATE
end while
```

Figure 10A:
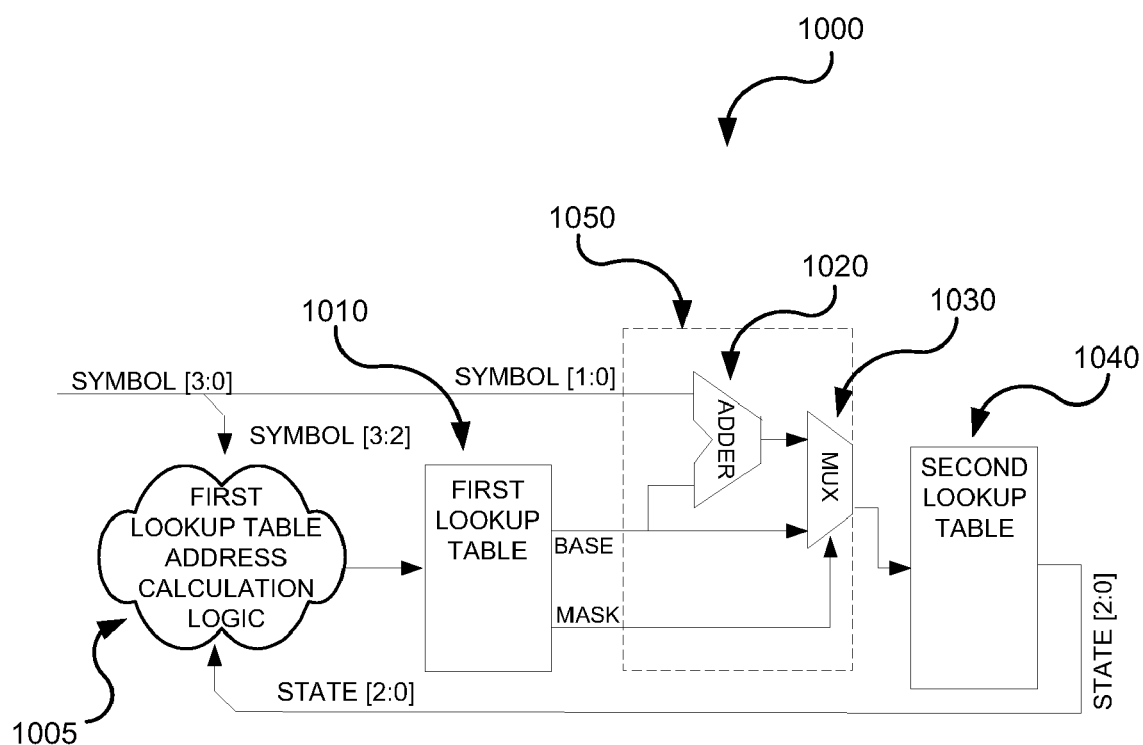
FIG. 10A shows a programmable finite state machine, having a first look-up table with rows that are partitioned in to blocks, in accordance with another embodiment of the present invention.
Figure 10B:
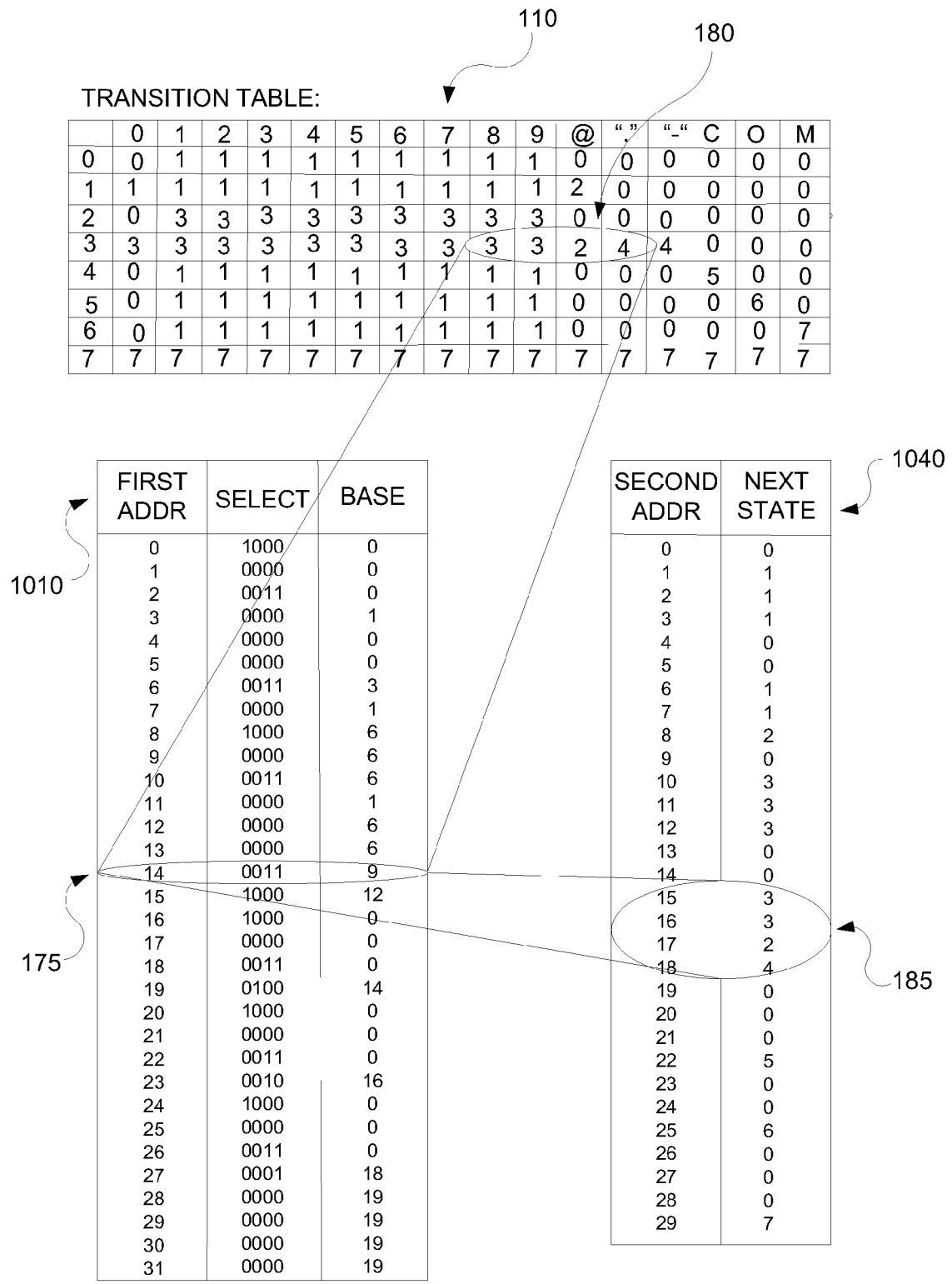
FIG. 10B shows exemplary select flags and base values stored in first lookup table, as well as corresponding next states stored in second lookup table of the programmable finite state machine of FIG. 10A.

FIG. 10A shows an exemplary programmable FSM 1000 having disposed therein a first lookup table 1010 that is partitioned into blocks along its rows. First address calculation logic unit 1005 is configured to concatenate the most two significant bits [3:2] of the input symbol with the three bits of the current state. The first lookup table 910 contains a select field and a base field for each transition block, as is shown in FIG. 10B. illustrates a suggested method for converting the FSM transition table into the two memory lookup tables required by the first and second examples of this invention (FIG. 7 and FIG. 8, respectively). The method operates on blocks of the transition table as discussed for the first and second examples given above, and populates the first and second lookup tables within the embodiment of the invention.

The select fields are applied to the control input terminal of multiplexer 1030. The base field is applied to a data input terminal of multiplexer 1030 and to one of the data input terminals of adder 1020. The least two significant bits of the input symbol are applied to a second input terminal of adder 1020. The output signal of adder 1020 is supplied to the second data input terminal of multiplexer 1030. Adder 1020 together with multiplexer 1030 form the second address calculation logic 1050. The output of the second address calculation logic 1050 determines the address of the next state in second lookup table 1040.

FIG. 10B shows select and base values stored in first lookup table 1010, as well as corresponding next states stored in second lookup table 1040 of FSM 1000, for transition table 110. Because in this example q is assumed to be equal to 2, table 110 is partitioned along its rows into 32 blocks each with 4 entries—that collectively represent the 128 transitions of this table. Accordingly, lookup table 1010 is configured to include 32 addresses, numbered 0 through 31. Entries 175 and 185 of lookup table 1010 and 1040, respectively, are associated with transition block 180 of transition table 110. The manner in which entries in lookup tables 1010, and 1040 are coded is described in the following pseudo-code:

```
initialise CURRENT_STATE
while data available,
    receive INPUT_SYMBOL
    set FIRST_ADDRESS =
    CURRENT_STATE . INPUT_SYMBOL[k-1:q]
    (SELECT, BASE) = FIRST_LUT[FIRST_ADDRESS]
    if SELECT = 1 then
        set SECOND_ADDRESS = BASE
    else
        set SECOND_ADDRESS = BASE +
        INPUT_SYMBOL[q-1:0]
    end if
    NEXT_STATE = SECOND_LUT[SECOND_ADDRESS]
    STATE = NEXT_STATE
end while
```

FIG. 11 is a flow chart 1100 of steps that may be carried out to code the transitions blocks of a transition table, e.g., transition table 110, into entries in associated first and second lookup tables, e.g., lookup tables 710 and 740, or lookup tables 810, 840, in accordance with one embodiment of the present invention. The first and second lookup tables 710, 740, 810, and 840 may be arbitrarily programmed to implement any finite state machine. It is understood that various other methods may be used to populate the first and second lookup tables, and that lookup table contents may be different for different architectures, as shown in the above drawings. The steps shown in flowchart 1100 use a greedy algorithm for producing a compact representation of the transition table implemented by an FSM.

At step 1005, the transition table for the FSM is generated as is understood by those skilled in the art. At step 1110, the entries in the first and second lookup tables are cleared. Next, at step 1115, variables m and i are both set to zero. Next, at step 1120, bit mask for block i of transition table is created. Next, at step 1125, the created bit mask is added to the mask field of the first lookup table. Next, at step 1130, a mini lookup table (LUT) is created form block i of the transition table. Next, at step 1130 a determination is made as to whether the created mini lookup table appears in the second lookup table. If, the created mini lookup table appears in the second lookup table, at step 1150, a corresponding entry is made in the base field of the first lookup table. Next, at step 1155, a determination is made as to whether the last block of the transition table is coded. If the last block of the transition table is coded, a move made to step 1165 is made, at which point the coding of the first and second lookup tables is completed. If at step 115, the determination is made that the last block of the transition table is not coded, a move to step 1160 is made, at which step variable i is incremented by 1, and a move to step 1120 is made. If at step 1135, determination is made that the created mini lookup table does not appear in the second lookup table, at step 1140, the mini lookup table is added to the end of the second lookup table. Next, at step 1145, the value of variable k is stored in the base field of the first lookup table and the variable m is increased by the size of the mini lookup table. The size of the lookup table is defined by the umber of entries in the lookup table. Next, a move to step 1155 is made. The following is a pseudo-code of the steps carried out in accordance with flowchart 1100:

```
construct transition table, TRANSITION_TABLE[2^n-1:0][2^k-1:0]
clear FIRST_LUT
clear SECOND_LUT
set m = 0
for each block, i, in TRANSITION_TABLE do
    /* create bit mask */
    find element with highest occurrence in block i
    for each element, j, in block i
        if j is the element with highest occurrence then
            Set MASK[j] = 0
        else
            Set MASK[j] = 1
        end if
    next j
    /* create mini-lookup table, LUT */
    set L = 0
    set LUT[0] to element with highest occurrence in block i
    for each element, j, in block i
        if corresponding mask bit is set
            set L = L + 1
            set LUT[L] to element j
        end if
    next j
    search for LUT in SECOND_LUT
    if found then
        set BASE to corresponding location in SECOND_LUT
    else
        set BASE to m
        set SECOND_LUT[m+L:m] = LUT
        set m = m + L + 1
    end if
    set FIRST_LUT[i] = (MASK, BASE)
next i
```

In the above pseudo-code, L is the number of non-zero bits in each mask field, and L+1 is the size of the associated mini-lookup table.

Figure 12:
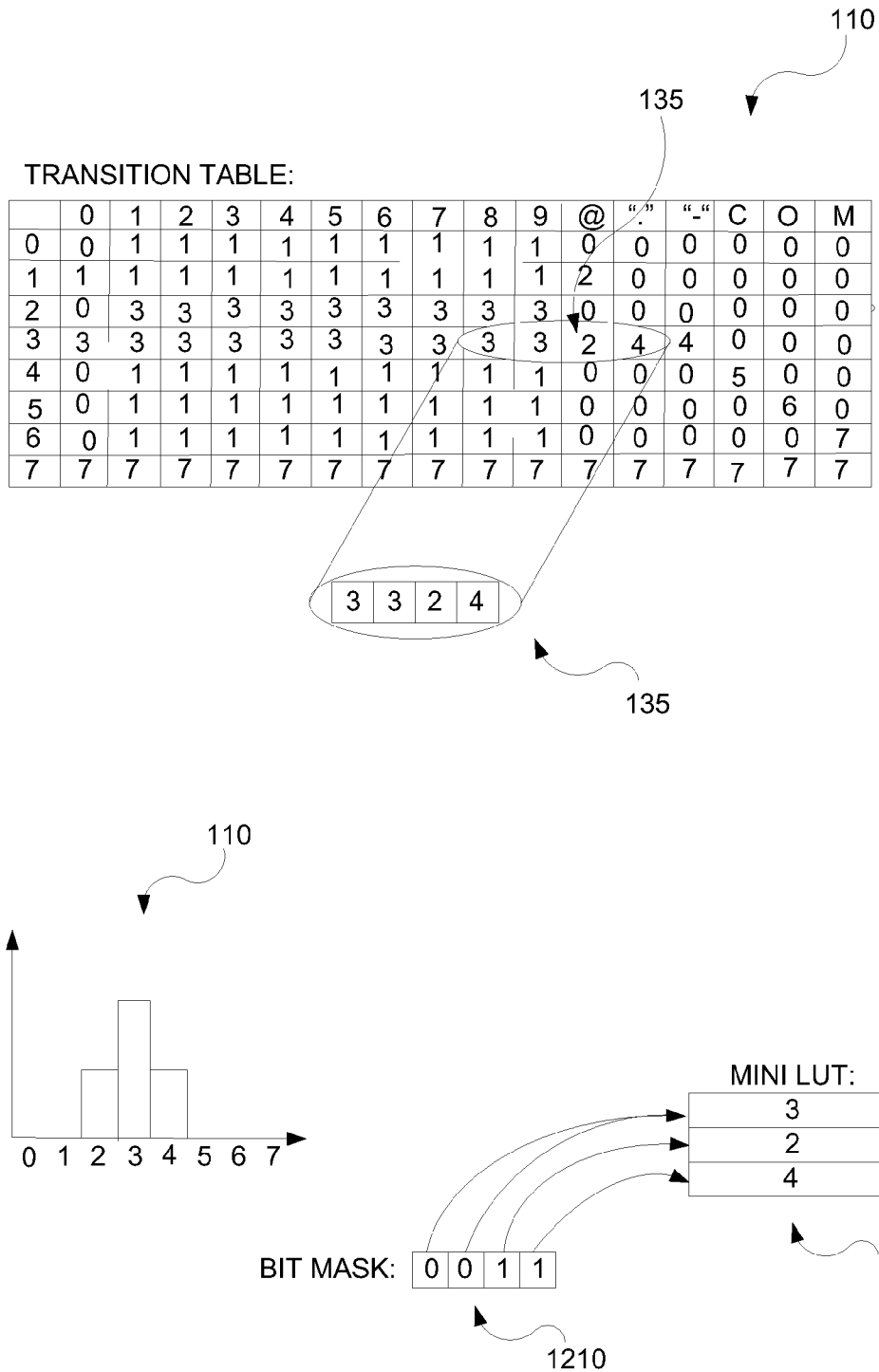
FIG. 12 shows the bit masks and mini lookup tables associated with one of the transition blocks shown in FIG. 8B, in accordance with one embodiment of the present invention.

FIG. 12 shows the bit mask and mini lookup table associated with transition block 135 shown in FIG. 8B, and as described in the above pseudo-code and flowchart 1100. Transitions to states 3 occur two times, and transitions to each of states 2 and 4 occur one time, resulting in associated histogram 1205. The entry with the highest occurrence is selected as the equivalence class for this block. If two or more entries tie for the same occurrence, then an arbitration scheme is employed to decide which entry to make the equivalence class. Equivalent classes represent redundant state transitions in the transition table. For example, there is a redundancy of two associated with transition to state 3. Because if the current state is state 3, and either input symbols 8 or 9 are received, the next state is state 3; therefore, these two transitions are equivalent transition. are in block 135 of transition table 11 (see, e.g., FIG. 12). Bit mask 1210 is formed by placing a zero in the position of entries corresponding to the equivalence class, and by placing a one in all other positions. Mini LUT 1210 is formed by placing the equivalence class entry, i.e., those associated with transition to state 3 and represented by mask bits 0, at position 1215_a which is the top entry in the mini LUT 1215. Transitions to states 2 and 4, represented by mask bits 1 are placed in positions 1215_b and 1215_c of mini LUT 125. To maintain the transition order the same as show in table 110, state 3 is entered above state 2, and state 2 is entered above state 4 in mini Lookup table 1215.

The finite state machines described above may further include a third lookup table containing one entry for each state. The third lookup table may be addressed by the current state to generate the FSM's output. In some embodiments, the output of the FSM indicates whether a match has been triggered by a regular expression. In yet embodiments, the unused bits of the second lookup table may be used to store the output of the FSM. In such embodiments, the second lookup table which holds the values of the next states, may be further configured to also contain the FSM's output values.

Although the foregoing invention has been described in some detail for purposes of clarity and understanding, those skilled in the art will appreciate that various adaptations and modifications of the just-described preferred embodiments can be configured without departing from the scope and spirit of the invention. For example, other operations for computing the first and second lookup table addresses may be used, or modifications may be made to the methods for renumbering states. Therefore, the described embodiments should not be limited to the details given herein, but should be defined by the following claims and their full scope of equivalents.

What is claimed is:

1. A programmable finite state machine configured to transition to a second state from a first state after receiving an input symbol, each of the first and second states being represented by n bits and each input symbol being represented by k bits, the programmable finite state machine comprising:

a first address calculation logic block configured to combine q bits of the k-bit input symbol, and p bits of the n-bit first state to generate a first address in response;

a first lookup table configured to receive the generated first address and to supply data associated with the received input symbol and the first state;

a second address calculation logic block configured to combine remaining k–q bits of the input symbol, and remaining n–p bits of the first state to generate a second address in response; and a second lookup table configured to receive the generated second address and to supply the second state.

2. The programmable finite state machine of claim 1 wherein each of the first and second lookup tables are programmable.

3. The programmable finite state machine of claim 1 wherein data stored in the first and second lookup tables are supplied by a compiler.

4. The programmable finite state machine of claim 1 wherein each of the first and second lookup tables includes at least one random access memory.

5. The programmable finite state machine of claim 4 wherein the at least one random access memory has an access time of less than 8 nanoseconds.

6. The programmable finite state machine of claim 1 wherein p is equal to n and wherein a third table representing state transitions of the programmable finite state machine are partitioned along rows of the third table into $2^{k-q}$ transition blocks.

7. The programmable finite state machine of claim 1 wherein q is equal to k and wherein a third table representing state transitions of the programmable finite state machine are partitioned along columns of the third table into $2^{n-p}$ transition blocks.

8. The programmable finite state machine of claim 1 wherein each of the first and second address calculation logic blocks further comprises a field programmable gate array.

9. The programmable finite state machine of claim 1 wherein each of the first and second address calculation logic blocks further comprises an application specific integrated circuit.

10. The programmable finite state machine of claim 1 wherein each of the first and second address calculation logic blocks comprises software instructions executed by a microprocessor.

11. The programmable finite state machine of claim 1 further comprising:
a communication interface coupled to a host system and configured to receive the input symbol.

12. The programmable finite state machine of claim 11 wherein the communication interface is a PCI interface.

13. The programmable finite state machine of claim 11 wherein the communication interface is an SRAM interface.

14. The programmable finite state machine of claim 1 further comprising: a first pipeline register disposed between the first address calculation logic block and the first lookup table.

15. The programmable finite state machine of claim 14 further comprising: a second pipeline register disposed between the first lookup table and the second address calculation logic block.

16. The programmable finite state machine of claim 15 further comprising: a third pipeline register disposed between the second address calculation logic block and the second lookup table.

17. The programmable finite state machine of claim 16 wherein both first and second lookup tables are pipelined.

18. The programmable finite state machine of claim 16 wherein each of the first, second and third pipeline registers is clocked at a frequency greater than 125 MHz.

19. The programmable finite state machine of claim 1 wherein the transition from the second state to the first state after occurs within a predetermined number of clock cycles.

20. The programmable finite state machine of claim 1 wherein a third table representing state transitions of the programmable finite state machine is partitioned into blocks along one or more rows of the third table and columns of the third table, wherein each row of the transition block spans one or more states and each column of the transition block spans one or more input symbols.

21. The programmable finite state machine of claim 20 wherein for each transition block, the first lookup table contains a first entry representing a base address, and an associated second entry representing a mask value, wherein the base address and the mask value for each transition block correspond to that transition block's location in the transition table.

22. The programmable finite state machine of claim 21 wherein the second lookup table address calculation logic block is configured to add an offset to the base value to calculate a corresponding address in the second lookup table, wherein the offset is determined using the associated mask value.

23. The programmable finite state machine of claim 22 wherein said offset is zero.

24. The programmable finite state machine of claim 20 wherein for each transition block, the first lookup table contains a first entry representing a base address, and an associated second entry representing a Boolean flag, wherein the base address and the Boolean flag for each transition block correspond to that transition block's location in the transition table.

25. The programmable finite state machine of claim 24 wherein the second lookup table address calculation logic block is configured to add an offset to the base value to calculate a corresponding address in the second lookup table, wherein the offset is determined in accordance with the Boolean flag and using a predefined number of bits from the first state and the input symbol.

26. The programmable finite state machine of claim 25 wherein said offset is zero.

27. The programmable finite state machine of claim 1 wherein the finite state machine is a deterministic finite-state automata (DFA) implementation of a regular expression, the DFA transition tables being compiled by a compiler to generate the first and second lookup tables.

28. The programmable finite state machine of claim 1 further comprising a third lookup table configured to contain one entry per state, wherein the one entry per state corresponds to an output state for which the finite state machine is configured to generate.

29. A method of determining a second state to which a transition is made after being in a first state, each of the first and second states being represented by n bits, the method comprising:
receiving a k-bit input symbol;
combining q bits of the k-bit input symbol and p bits of the n-bit first state to generate a first address in response;
supplying data associated with the received input symbol and the first state in response to the generated first address;
combine the remaining k−q bits of the input symbol, and the remaining n−p bits of the first state to generate a second address in response; and
supplying the second state in response to the second generated address.

30. The method of claim 29 wherein the data associated with the received input symbol and the first state in response to the generated first address is supplied from a programmable first lookup table and the second state is supplied from a programmable second lookup table.

31. The method of claim 30 further comprising:
compiling data in the programmable first and second lookup tables.

32. The method of claim 30 wherein each of the first and second lookup tables includes at least one random access memory.

33. The method of claim 32 wherein the at least one random access memory has an access time of less than 8 nanoseconds.

34. The method of claim 29 wherein p is equal to n and further comprising:
partitioning entries of an associated state transition table along its rows so as to generate $2^{k-q}$ transition blocks.

35. The method of claim 29 wherein q is equal to k and further comprising:
partitioning entries of an associated state transition table along its columns so as to generate $2^{s-p}$ transition blocks.

36. The method of claim 29 wherein each of the first and second addresses are generated using at least one programmable gate array.

37. The method of claim 29 wherein each of the first and second addresses are generated using at least one application specific integrated circuit.

38. The method of claim 29 wherein each of the first and second addresses are generated using software instructions executed by a microprocessor.

39. The method of claim 29 further comprising:
receiving the input symbol via a communication interface coupled to a host system.

40. The method of claim 39 wherein the communication interface is a PCI interface.

41. The method of claim 39 wherein the communication interface is an SRAM interface.

42. The method of claim 29 wherein the generation of the first address and the supply of data associated with the received input symbol and the first state are pipelined operations.

43. The method of claim 42 wherein the supply of data associated with the received input symbol and the first state and the generation of the second address are pipelined operation.

44. The method of claim 43 wherein the generation of the second address and the supply of the second state are pipelined operations.

45. The method of claim 44 wherein each of the pipelined operations are clocked at a frequency greater than 125 MHz.

46. The method of claim 30 wherein both first and second lookup tables are pipelined.

47. The method of claim 29 wherein the transition from the second state to the first state occurs within a predetermined number of clock cycles.

48. The method of claim 30 comprising:
partitioning state transitions stored in a third table into blocks along one or more rows of the third table and columns of the third table, wherein each row of the transition block spans one or more states and each column of the transition block spans one or more input symbols.

49. The method of claim 48 further comprising:
storing an associated base address and mask value in the first lookup table for each transition block in the third table, wherein the base address corresponds to a location in the second lookup table and the associated mask value corresponds to that transition block's location in the transition table.

50. The method of claim 49 further comprising:
adding an offset to the base address and in accordance with the associated mask value to calculate a corresponding address in the second lookup table.

51. The method of claim 50 wherein said offset is zero.

52. The method of claim 48 further comprising:
storing an associated base address and Boolean flag in the first lookup table for each transition block in the third table, wherein the base address corresponds to a location in the second lookup table and the Boolean flag corresponds to that transition block's location in the transition table.

53. The method of claim 52 further comprising:
adding an offset to the base address in accordance with the associated Boolean flag and a predefined number of bits from the first state and the input symbol to calculate a corresponding address in the second lookup table.

54. The method of claim 53 wherein said offset is zero.

55. The method of claim 54 wherein the first and second states are states of a programmable finite state machine wherein the finite state machine is a deterministic finite-state automata (DFA) implementation of a regular expression, the DFA transition tables being compiled by a compiler to generate the first and second lookup tables.

56. The method of claim 29 further comprising:
forming a third lookup table configured to generate an output when the transition to the second state is made.

* * * * *